United States Patent
Abdul et al.

(10) Patent No.: US 10,521,609 B2
(45) Date of Patent: *Dec. 31, 2019

(54) SECURELY TRANSFERRING DATA OVER A COMPUTER NETWORK

(71) Applicant: INTERNATIONAL BUSINESS MACHINES CORPORATION, Armonk, NY (US)

(72) Inventors: Javed Iqbal Abdul, Sydney (AU); Jose Peter, Sydney (AU); Nisanth M. Simon, Westmead (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/260,220

(22) Filed: Jan. 29, 2019

(65) Prior Publication Data

US 2019/0156063 A1    May 23, 2019

Related U.S. Application Data

(63) Continuation of application No. 15/465,664, filed on Mar. 22, 2017, now Pat. No. 10,242,231.

(51) Int. Cl.
*G06F 7/04* (2006.01)
*G06F 21/62* (2013.01)
*G06Q 30/02* (2012.01)
*G06F 16/35* (2019.01)
*G06F 17/30* (2006.01)

(52) U.S. Cl.
CPC .......... *G06F 21/6254* (2013.01); *G06F 16/35* (2019.01); *G06F 21/6227* (2013.01); *G06Q 30/0282* (2013.01)

(58) Field of Classification Search
CPC .......... G06F 21/6254; G06F 17/30705; G06F 21/6227; G06Q 30/0282
USPC ................ 726/22, 26, 27; 713/189; 715/255
See application file for complete search history.

(56) References Cited

U.S. PATENT DOCUMENTS

| | | | |
|---|---|---|---|
| 8,209,549 B1 | 6/2012 | Bain, III | |
| 9,223,995 B1* | 12/2015 | Lavinio | G06F 21/606 |
| 9,305,181 B1* | 4/2016 | Watson, III | G06F 21/6254 |

(Continued)

OTHER PUBLICATIONS

Gedis Studio; Anonymization with Data Masking and Data Scrambling; Retrieved from the Internet Nov. 16, 2016; URL: http://www.gedis-studio.com/anonymization.html; 6 pages.

(Continued)

*Primary Examiner* — Gary S Gracia
(74) *Attorney, Agent, or Firm* — Schmeiser, Olsen & Watts, LLP; William Hartwell

(57) ABSTRACT

The present invention provides a method, and associated computer system and computer program product, for masking selected vulnerable data portions of a data set transmitted over a network by parsing the vulnerable data, generating masked values for the vulnerable data including generating symbols of the masked values of a parsed word of the parsed vulnerable data, updating the data set to include the masked values, then sending the updated data set to a third party for analysis and for subsequent decoding of the masked values of the parsed vulnerable data. The symbols, used to represent basic sounds of a language, are contained in a set in a fixed order.

20 Claims, 7 Drawing Sheets

(56) References Cited

U.S. PATENT DOCUMENTS

| | | | |
|---|---|---|---|
| 2005/0262557 A1* | 11/2005 | Fellenstein | H04L 63/0428 |
| | | | 726/22 |
| 2009/0281974 A1 | 11/2009 | Saxena et al. | |
| 2011/0040983 A1* | 2/2011 | Grzymala-Busse | ......... |
| | | | G06F 21/6245 |
| | | | 713/189 |
| 2013/0024769 A1* | 1/2013 | Sumida | G06F 17/2735 |
| | | | 715/255 |
| 2013/0275752 A1 | 10/2013 | Zhang et al. | |
| 2014/0019756 A1 | 1/2014 | Krajec | |
| 2014/0283089 A1* | 9/2014 | Arya | G06F 21/60 |
| | | | 726/26 |
| 2015/0379303 A1 | 12/2015 | Lafever et al. | |
| 2018/0004976 A1* | 1/2018 | Davis | G06F 21/6254 |
| 2018/0276411 A1 | 9/2018 | Abdul et al. | |

OTHER PUBLICATIONS

Notice of Allowance (dated Nov. 16, 2018) for U.S. Appl. No. 15/465,664, filed Mar. 22, 2017.

* cited by examiner

US 10,521,609 B2

SECURELY TRANSFERRING DATA OVER A COMPUTER NETWORK

This application is a continuation application claiming priority to Ser. No. 15/465,664, filed Mar. 22, 2017.

TECHNICAL FIELD

The invention relates generally to the field of transferring data over a computer network, and in particular to a method and system for selectively masking vulnerable parts of data to be transferred.

BACKGROUND

When data is transferred over a computer network, the data can include vulnerable confidential or sensitive segments that need protection from parties who are not the intended recipients. Accordingly, there is a need for improved systems and methods of selectively masking confidential segments of a communicated message or document.

SUMMARY

The present invention provides a method, and associated computer system and computer program product, for masking selected vulnerable data portions of a data set transmitted over a network by parsing the vulnerable data, generating masked values for the vulnerable data, updating the data set to include the masked values, then sending the updated data set to a third party for analysis.

The masked values for words and number strings of the data set are generated on a computer by a first party parsing a vulnerable data word or number string, then incrementing or decrementing a position of each character of the vulnerable data word or number string and selecting a substitute character from a predefined masking character set. In some cases a marker value is periodically inserted into the string of masked characters which constitute the masked value of the initial word or number string. The masked word or number string is then sent to a third party for analysis, whereby the third party is unable to reap any insights into the meaning of vulnerable data which is masked.

DETAILED DESCRIPTION

Figure 1:
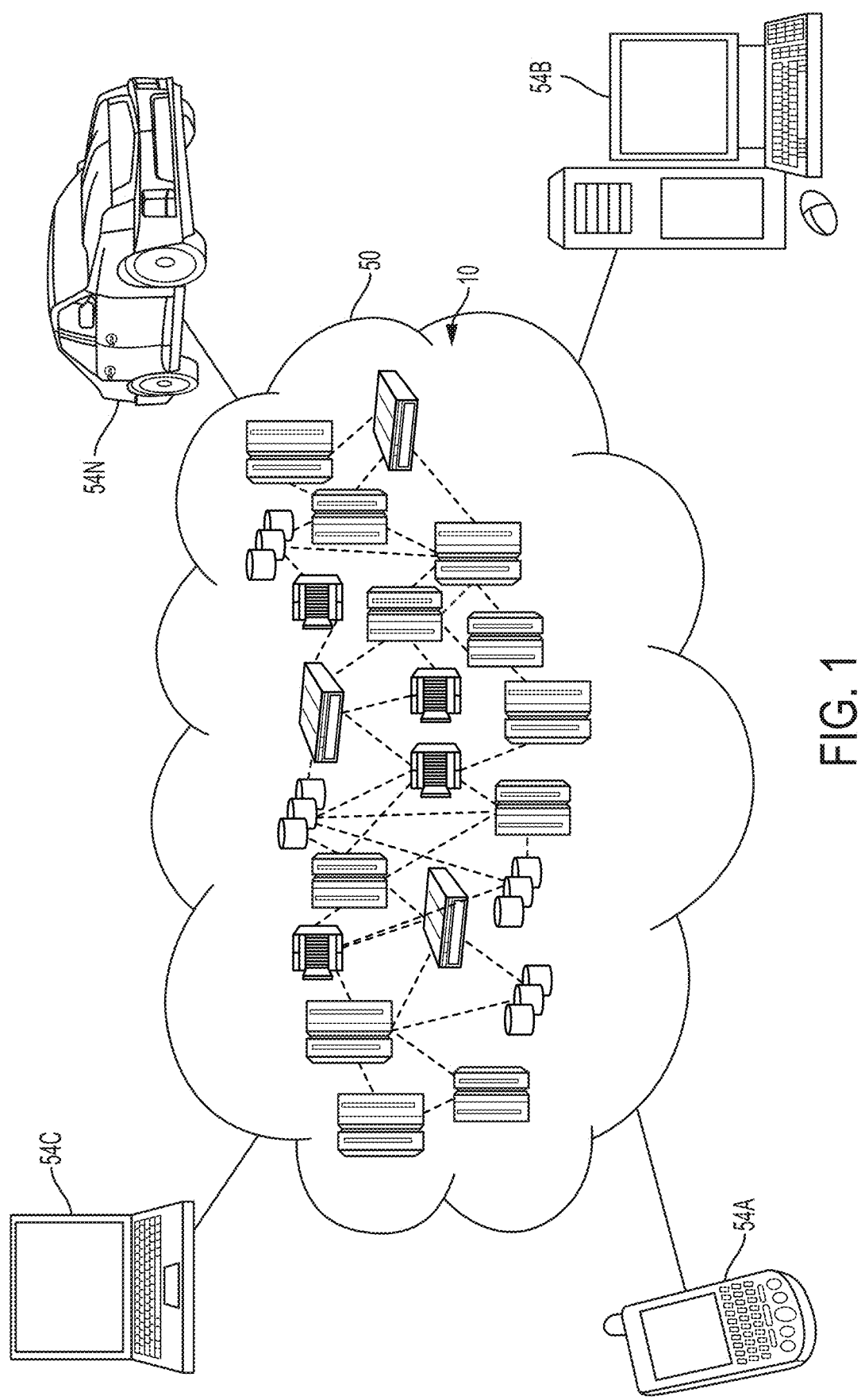
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
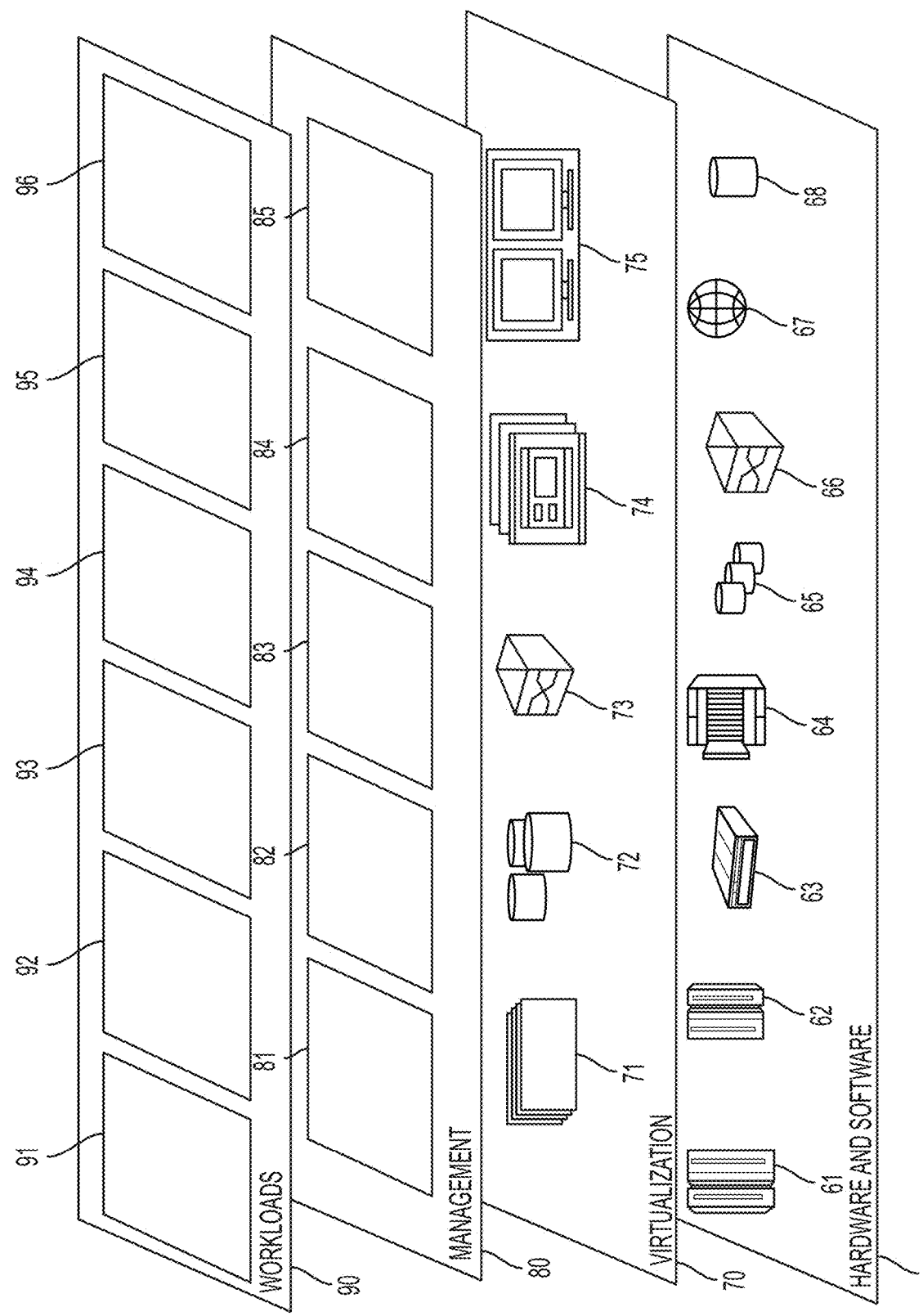
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective masking of words and numbers in a message or document 96.

There are scores of companies (i.e. second parties) that receive large volumes of feedback from customers (i.e. first parties) with complaints making up the bulk of the feedback. These companies need to find meaningful insights from this heap of data in order to take corrective actions wherever applicable that would result in continued customer loyalty. For insight analysis, the data is often handed over to a vendor (third party) to analyze the voluminous data. Some keywords are usually replaced with their own words and hence a hard mapping is often the norm. Once the third party receives and performs analysis on the data set, hidden insights of the company and their vulnerabilities are subject to exposure which in turn breaches the privacy and security of any data insights. Hence there is a need to identify vulnerability values of parts of the data set, and to selectively mask the vulnerable values before transferring the data set to the third party.

The current invention focuses on masking vulnerable insights of a data set which might otherwise showcase one's vulnerabilities in raw form, and using a progressive masking method to mask the vulnerable insights while maintaining the sanity, integrity and meaning of the data set. Only the vulnerable values in the data set are identified and masked using the progressive masking method. Subsequently, the data set containing the masked vulnerabilities are transferred from a first party (e.g. customer) to a third party vendor in order to analyze and process the data set before forwarding it to the second party (e.g. company). Once the data set with the masked insights is transferred from the third party to the company, the company decodes or reverse engineers the data set for complete readability.

Figure 3:
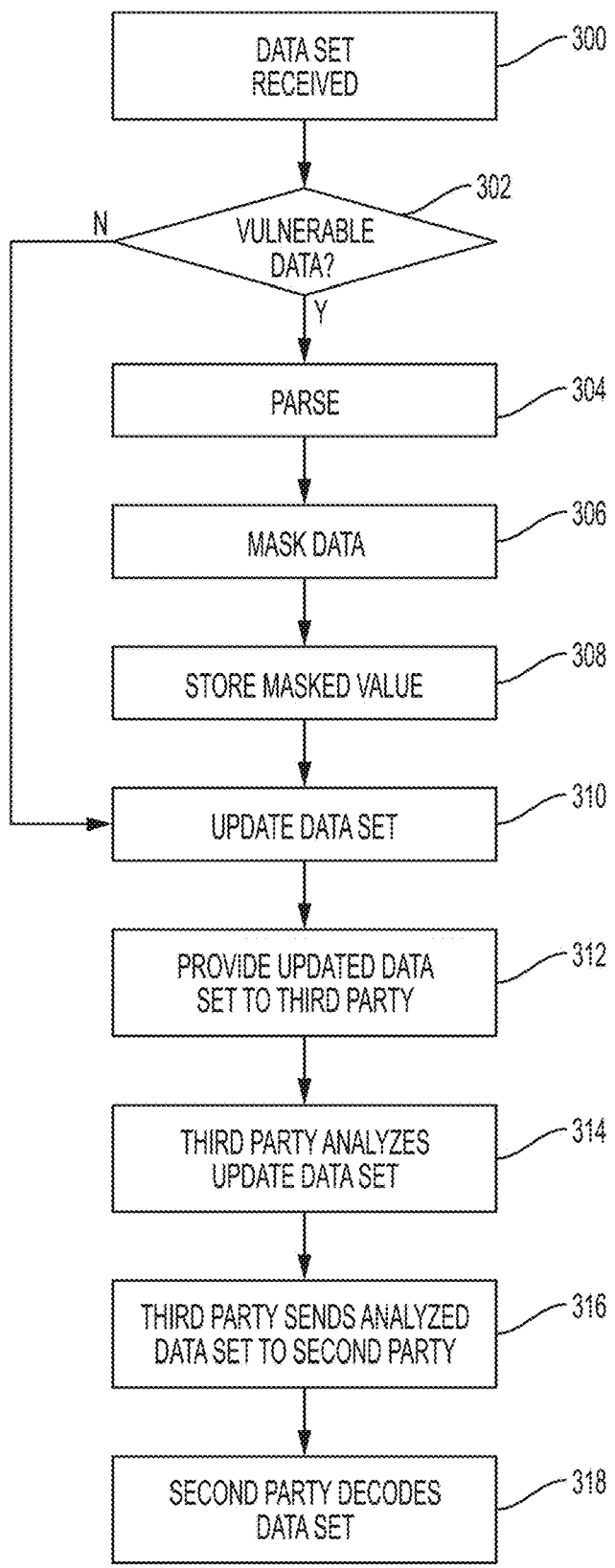
FIG. 3 is a flow chart diagram of a method in accordance with embodiments of the present invention.

FIG. 3 is a flow chart diagram of a method in accordance with embodiments of the present invention. The various steps of the method are performed by a first party's computer. In step 300 a data set is received which provides information of interest for a second party. The data set includes, but is not limited to, words, numbers and other symbols. In the current example, the data set is defined to include only words and number strings.

Step 302 determines whether a word or number string of the data set is confidential, i.e. vulnerable, data. If a word/number is not vulnerable, then it moves on to step 310 of the method. If a word/number is identified as vulnerable data, i.e. a vulnerable one, then the vulnerable word or number string is parsed in step 304.

Vulnerable data of the data set is defined as individual words or number strings (or e.g. sentences or paragraphs) which depict confidential or proprietary information about either the first party or the second party. In this example, the second party is a company which has requested feedback from the first party customer in regards to a product or service supplied by the company to the customer. A third party vendor has been retained by the second party company to analyze the data received from the first party customers.

In step 306 the parsed vulnerable data from the data set is masked to generate an individual masked value for each word or number string, respectively, whereby the masked values are encoded in such a way that they cannot be understood without decoding. The masked values are stored in a mask database of the first party's computer in step 308. This mask database can be duplicated and shared with the second party company.

In step 310 the data set is updated by combining non-masked data with the masked data of the data set, thereby creating an updated data set which is partially illegible due to masking of the selected vulnerable data. The updated data set is then sent to the third party for analysis in step 312. The third party analyzes the data set in step 314 according to any number of criteria established by the second party company. For instance, the company may request that the data is categorized by physical location of the customer, by urgency for response, by dead mail submissions, etc. At this point the analyzed data set is sent to the second party company in step 316 whereby the company will decode the masked vulnerable data for readability in step 318.

In one example, a company receives thousands of feedback files from various clients. Each feedback file is first input and received on a client's computer in preparation for sending to the company. In many cases the company will hire a third party vendor to handle, organize and analyze all of the feedbacks that are received from the various clients. After organization and analysis, the third party vendor will then forward the feedback files to the company.

Each feedback file from each client must mask any confidential or vulnerable data prior to being sent to the third party vendor. Initially the words and number strings of the feedback file are parsed and vulnerable ones are masked and stored in an appropriate dictionary. The data which is present in these dictionaries can be termed 'vulnerable values' because exposing this data in a raw format to any third party would expose the vulnerabilities of the company and help third parties gain insight into established and perceived weaknesses. Therefore, it is imperative that all the sensitive vulnerable data is masked to prevent detection by a third party.

If a location of a client/customer is considered as a confidential/vulnerable term, then any symbol, word or number which identifies the vulnerable location or address is masked and stored into a Location Dictionary. A masked term which identifies a product will be stored in a Product Dictionary. A masked term which identifies a feature of a product will be stored in a Feature Dictionary. A masked term which identifies a service will be stored in a Service Dictionary. A masked term which identifies a sentiment (such as the client being happy, sad, disappointed, etc.) will be stored in a Sentiment Dictionary. A masked term which identifies a specific plan (such as a service plan) will be stored in a Plan Dictionary. Many other dictionary types can be used to categorize the vulnerable terms.

The data masking should be implemented by factoring several key components such as:

Maintaining Data Sanity
Preserving format
Efficient Reverse Engineering

The data sanity has to be upheld and the masked values need to be evaluated to check if the vulnerable term is rational and holds value. The format cannot be distorted. For example, masking a birthday cannot be output as ABCD. It should be in an acceptable form such as month/day/year or AA/BB/CCCC. Unacceptable format changes could render the analysis ineffective and useless. Therefore the format has to be preserved. There should also be means for an efficient reverse engineering mechanism for decoding the masked data so that the blurred insights can be seen clearly by the company once the analysis results are received.

One manner of reverse engineering is rendered efficient by employing a Rules Index Table which stores the following values:

D is the dictionary type
L is the masked string length
V is the masked value
P is the position of the masked value in a feedback message.

The dictionary type D determines into which dictionary the masked value V will be stored, and the masked string length L is defined as a positive whole number. The masked value V holds the vulnerability value that has been masked using a progressive masking method to be described below. This masked value V is stored in the table and substituted into the client feedback file. The position P of the masked value V is determined to accurately position the parsed vulnerable terms of the feedback file and provide accurate location information for decoding. If the position P is not retained of the vulnerable terms in the feedback message or file, then the whole file may need to be parsed.

In one embodiment, each letter of a vulnerable word is parsed and masked in a progressive manner. The method is uniform for all text and contains the following constraints.

a) English characters are used with an alphabetical set of 52 characters, 26 being lowercase and 26 being uppercase.
b) The characters are case sensitive.
c) Incremental and decremental operations are invoked progressively.
d) An incremental counter 'i' is reset after every 2 letters.
e) An extra character starting from j is inserted after every three characters of the word.

A telecommunications company named Telco commissions a third party vendor to receive email feedback from Telco customers for analysis on behalf of the company. Sample email data follows.

```
<emailId>joe@gmail.com</emailId>
<phone> +19986134889 </phone>
<emailData>
  Hi,
  My Phone number is +19986134889 . I am using Telco_plan_250 and I am experiencing
  severe call drops when I receive calls from my home town north of Sydney. I am not
  happy with the service. Please resolve this issue ASAP.
  Thanks,
  Joe
<emailData>
```

If the above dataset were to be analyzed in its original format as shown above, the third party vendor would know that the Telco_plan_250 has a problem with dropped calls in a town north of Sydney such as Parramatta (extracted from viewing the telephone number). This creates a vulnerability to Telco since the insights from the customer feedback email are exposed to the third party.

A solution is to mask the vulnerable values of the unstructured data with a progressive masking method where the masked vulnerable characters, words and number strings are all shown in bold type below.

```
<emailId>XXXXXX</emailId>
<phone> XXXXXXXXXXXXXXXXX</phone>
<emailData>
  Hi,
  My Phone number is +28069070035. I am using udnjar_lkpws_342 and I am
  experiencing severe dznlj gomsl when I receive calls from my home town north of
  Txfnlhv. I am not izrjnb with the service. Please resolve this issue ASAP.
  Thanks,
  Joe
<emailData>
```

Upon masking, the Telco company can now share the dataset which contains the feedback file with masked data along with dictionaries of the masked data types to the third party which in turn can analyze the unstructured data. The third party will send the analyzed feedback file to the Telco company which in turn will reverse engineer the masked portions to obtain clear and real insights.

Figure 4:
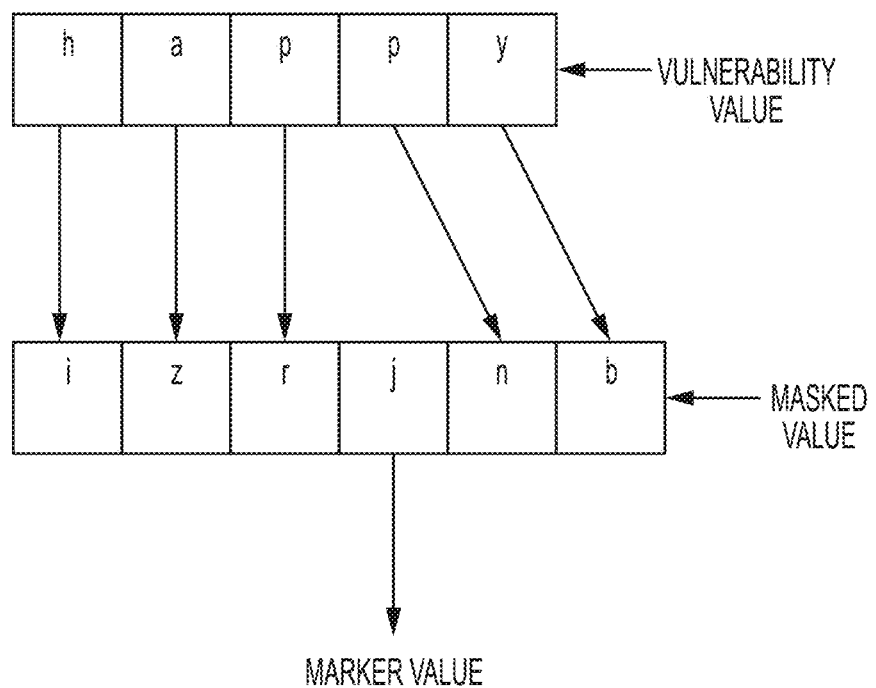
FIG. 4 is a diagrammatic representation of masking a vulnerable word according to an embodiment of the present invention.

FIG. 4 is a diagrammatic representation of masking a vulnerable word according to an embodiment of the present invention. The client feedback is "I am happy". The word "happy" is a vulnerable word or value which requires masking since it can give meaningful sensitive insights to the third party vendor who analyzes the feedback. The vulnerable value is populated in a sentiment database, also referred to as a sentiment dictionary and it is encoded according to the progressive masking method whereby the initial value of a counter is i=1, the initial value of a marker is m=j, and the character set is {a,b,c,d,e,f,g,h,i,j,k,l,m,n,o,p,q,r,s,t,u,v,w,x,y,z}.

The first letter "h" of the word "happy" is incremented by 1 place in the character set and thus becomes "i". Next the letter "a" of the word "happy" is decremented by 1 in the character set and becomes "z". Note that the counter i is incremented by 1 for every two letters which are encoded (not counting the marker letter). Thus after the letter "a" of the word "happy" is encoded, then i is incremented so that i=2. The next letter "p" of the word "happy" is now incremented by 2 places to "r" in the character set since the value of i is 2. At this point a marker "j" is inserted into the encoded, masked string. A marker is inserted every 3 letters either from the start of the word, or from the last known marker. The marker counter m initially holds the value of "j" and the marker will be incremented when the next 3 letters are complete. After inserting "j", the marker shifts one place to the right and becomes "k" for the next marker use. The fourth letter "p" of the word "happy" is now decremented by 2 places to "n" in the character set since i=2. At this point the counter is again incremented by one to i=3. The next letter "y" of the word "happy" is incremented by i=3 places in the character set to "b" since after the last character "z" the letters of the character set will circle back to "a". In the same way, if a character "a" is decremented by one, then it would become a "z". The masking is now complete for the original word "happy" which has become "izrjnb".

This value of "izrjnb" is submitted into the mask dictionary and into the feedback file of the customer before being transferred to the third party vendor so that the vendor will not be able to derive meaningful insights from the term. This method is quite effective since even the repetition of letters as in the word "happy", triggers two different masked characters in the encoded word.

Figure 6:
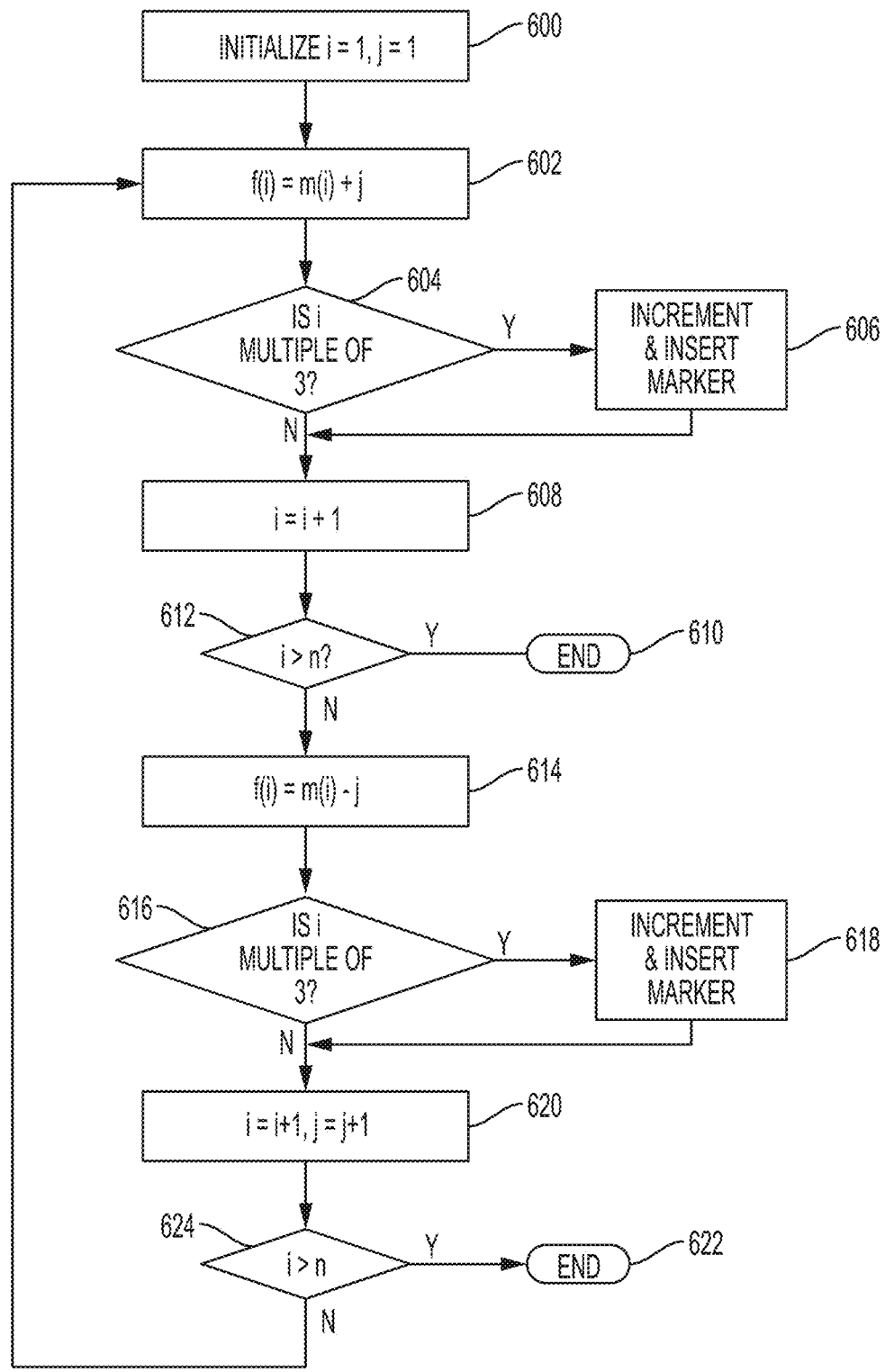
FIG. 6 is a flowchart diagram of a method for masking a vulnerable word according to an embodiment of the present invention.

FIG. 6 is a flowchart diagram of a method for masking vulnerable words according to an embodiment of the present invention. In step 600 the character counter i is initialized to i=1 and the position change parameter j is initialized to j=1. Turning to FIG. 4, i=1 refers to the first character "h" of the word "happy". The second character "a" corresponds to i=2, etc. The position change parameter "j" corresponds to the number of character position changes when a character of the word is encoded. For instance, for the first character "h" of the word "happy" where i=1, the encoding or masking will change the "h" by j=1 position in the alphabet character set to a masked value of "i" as shown in FIG. 4. This is shown in step 602 where the masked value of the first character "h" is represented as f(i)=m(i)+j or f(1)=m(1)+1. In other words the masked value f(i) of the first character "h" where i=1 is determined as the current character value m(1)=h incremented by j, where j=1. Thus the first character is encoded to the letter/character which is one placed removed in a positive direction in the alphabet character set so that f(i)=i.

Step 604 determines whether the counter i is a multiple of 3 since the method requires a marker value to be inserted into the masked value string after every three letters are encoded. If the counter i is a multiple of 3, then a predetermined marker value is incremented and inserted into the masked value string in step 606 and the method continues thereafter in step 608. In the example of FIG. 4 the marker value which was initialized as the character "i" is incremented by one position to the character "j", then inserted into the masked valued string as shown. The marker value could be initialized to any character of any character set e.g. a separate marker character set. Moreover the marker value could be moved positively or negatively.

If step 604 determines that the counter value "i" is not a multiple of 3, then the process continues whereby the counter value i is incremented to i=i+1 in step 608. Step 612 determines whether i>n, where i is the character counter value for the letter of the word being encoded, and n is the total number of characters of the word. In the case of FIG. 4, n=5 since the word "happy" has 5 characters. If i>n in step 612, then the process ends in step 610.

If the counter value i is not greater than n in step 612, then step 614 determines the next masked value f(i) whereby f(i)=m(i)−j. In this case for i=2, the second letter "a" of the word "happy" is encoded by decrementing one position since j=1 so that the masked value is "z". Hence, f(2)=z. Step 616 determines whether the counter i is a multiple of 3. If the counter i is a multiple of 3, then the marker value is incremented and inserted into the masked value string in step 618 and the method continues thereafter in step 620. If the counter value i is not a multiple of 3, then the process continues in step 620.

In step 620 both parameters i and j are incremented by one and step 624 again tests whether i>n. If the counter value i is greater than the number of characters (in this case n=5), then the process ends in step 622. Otherwise the process loops back to step 602.

Figure 5:
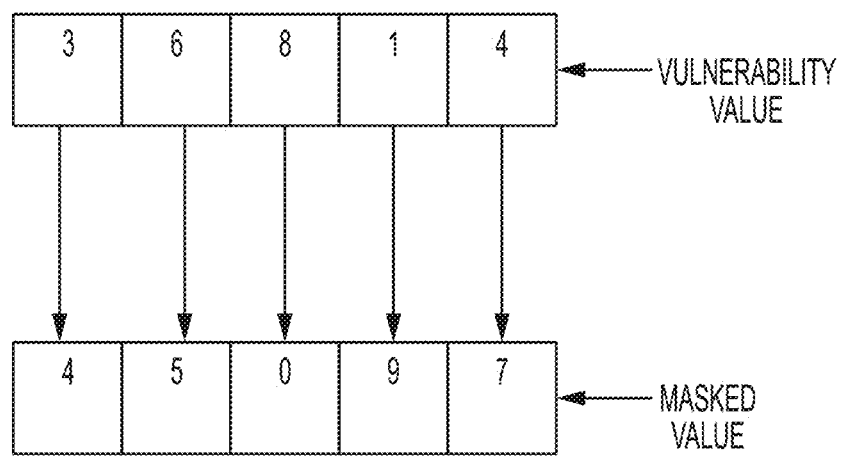
FIG. 5 is a diagrammatic representation of masking a vulnerable number string according to an embodiment of the present invention.

FIG. 5 is a diagrammatic representation of masking a vulnerable number string according to an embodiment of the present invention. As with encoding of words, each vulnerable number string will be parsed and masked in a progressive manner. Here the constraints are set for a number array containing whole number values from 0 to 9. The method is uniform for all numerals and the following constraints apply.

a) A number string is recognized, parsed and masked.
 b) The array in use is {0,1,2,3,4,5,6,7,8,9}.
 c) Incremental and decremental operations are invoked progressively.
 d) An incremental counter i is initialized at i=1 and reset with every 2 characters.
 e) No extra character is entered (as when encoding words) to maintain data sanity and preserve formats.

The example of FIG. 5 considers the number string 36814 which in this case is an account number for a customer of the Telco company which cannot be exposed. Hence, this number is a vulnerable value with meaningful insights. The vulnerable value is populated in one or more databases such as a Personal Dictionary or a Customer Number Dictionary. It is masked as follows.

The number array or character set is given as {0,1,2,3,4,5,6,7,8,9}. The initial value of the character counter is i=1. The first number "3" of the number string "36814" is incremented by 1 place in the array and thus becomes 4. The second number "6" of the number string "36814" is decremented by 1 and becomes 5. Now the value of i is incremented by one for every 2 numbers, so i=2. The next number "8" of the number string "36814" is incremented by 2 places in the array to "0" because the value of i is 2. There is a wrap around feature used for incrementing and decrementing numbers in the array. The next number "1" of the number string "36814" is now decremented by 2 places to "9" since i=2. Next the counter is again incremented to i=3. Finally the last number "4" of the number string "36814" is incremented by 3 places to become 7. The original number string of 36814 has been encoded or masked to 45097. This masked value is then substituted into the masked dictionary and also into the feedback file before transfer to the third party vendor. The masked value will prevent the vendor from deriving meaningful insights from the data because the customer number will be disguised.

Figure 7:
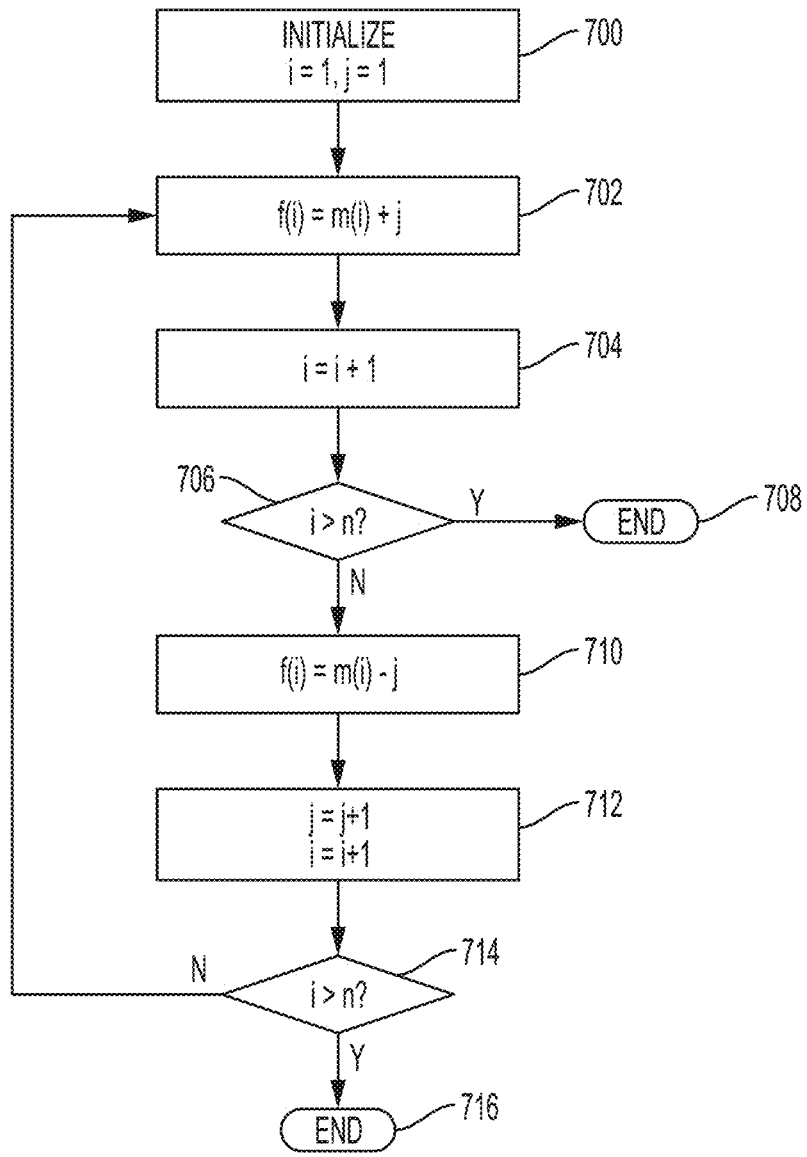
FIG. 7 is a flowchart diagram of a method for masking a vulnerable number string according to an embodiment of the present invention.

FIG. 7 is a flowchart diagram of a method for masking vulnerable numbers according to an embodiment of the present invention. In step 700 the counter parameter i and the character value j are both initialized to one. In the example of encoding a number string such as the vulnerability value 36814 as shown in FIG. 4, each of the characters are single digit whole numbers. The masked values are also single digit whole numbers selected from a number set in this example, however, in other embodiments the masked character set could be numbers, letters or any other symbols.

In step 702 the masked value for the first character is f(1)=m(1)+1=3+1 where m(1) is the first character "3" of the number string 36814. The counter parameter i is incremented as i=i+1 in step 704, and step 706 determines whether the counter value i is greater than the number of characters of the number string being masked. In this case the number string of "36814" has 5 characters so n=5. If i>n, then the process ends in step 708. If the counter value i is not greater than n, then the process continues in step 710 where the next masked value digit is determined as f(2)=m(2)−1=6−5. Step 712 increments both i and j by one and step 714 determines whether the counter value i is greater than n. If i is greater than n, then the process ends in step 716. If i is not greater than n, then the process loops back to step 702.

The above progressive masking methods prevent third parties from access to confidential, sensitive or vulnerable parts of a data set that is transmitted on a computer network such as an intranet, cloud or the Internet. The vulnerable parts of the data set are encoded or masked to prevent readability while maintaining the sanity of the data.

Figure 8:
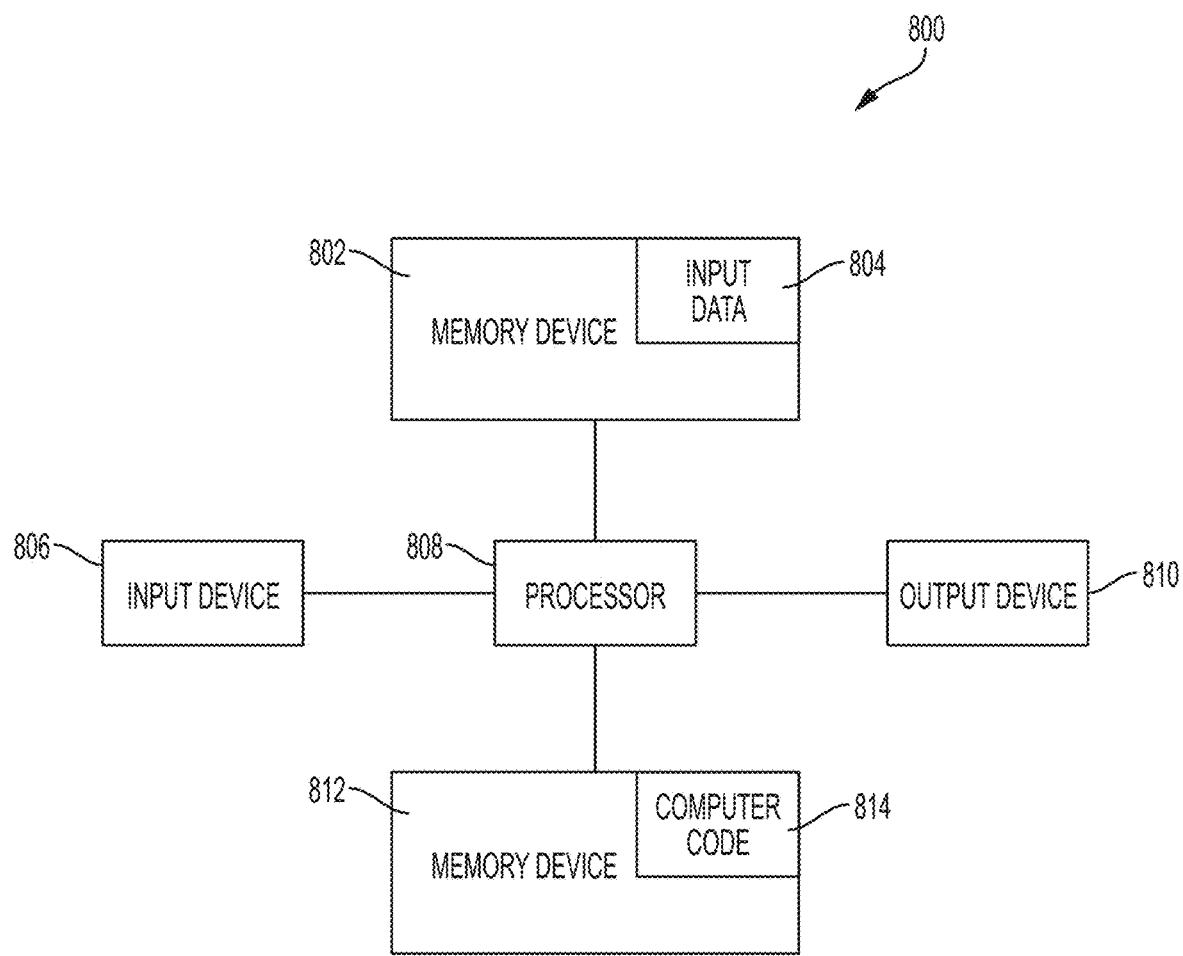
FIG. 8 illustrates an embodiment of a computer system used for implementing the methods of the present invention.

FIG. 8 is a block diagram of a computer system, aka computing device, 800 for implementing search engine optimization based upon most popular search histories in accordance with embodiments of the present invention. The computing device 30 includes a processor 808, an input device 806 coupled to the processor 808, an output device 810 coupled to the processor 808, and memory devices 802 and 812 each coupled to the processor 808. The input device 806 may be, inter alia, a keyboard, a mouse, etc. The output device 810 may be, inter alia, a printer, a plotter, a computer screen, a magnetic tape, a removable hard disk, a floppy disk, etc. The memory devices 802 and 812 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 812 includes a computer code 814 which is a computer program that includes computer-executable instructions.

The computer code 814 includes software or program instructions that may implement an algorithm for implementing methods of the present invention. The processor 608 executes the computer code 814. The memory device 802 includes input data 804. The input data 804 includes input required by the computer code 814. The output device 810 displays output from the computer code 814. Either or both memory devices 802 and 812 (or one or more additional memory devices not shown) may be used as a computer usable storage medium (or program storage device) having a computer readable program embodied therein and/or having other data stored therein, wherein the computer readable program includes the computer code 814.

Generally, a computer program product (or, alternatively, an article of manufacture) of the computer system/device 800 may include the computer usable storage medium (or said program storage device). The processor 808 may represent one or more processors. The memory device 802 and/or the memory device 812 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securely transferring data over a computer network, said method comprising:
    identifying, by a first party's computer, vulnerable words and numbers of a data set that provides information for a second party, said data set including words and numbers;
    parsing, by the first party's computer, the identified vulnerable words and numbers of the data set;
    generating, by the first party's computer, masked values of the parsed vulnerable words and numbers;
    updating, by the first party's computer, the data set by replacing the vulnerable words and numbers with the masked values; and
    sending, by the first party's computer data over the computer network, the updated data set to a third party for analysis, and for subsequent decoding, by the second party, of the masked values of the parsed vulnerable words and numbers,
    wherein said generating masked values of the vulnerable words and numbers comprises:
        generating, by the first party's computer, a first symbol of the masked values of a parsed word by incrementing a first symbol of the parsed word by one;
        generating, by the first party's computer, a second symbol of the masked values of the parsed word by decrementing a second symbol of the parsed word by one;
        generating, by the first party's computer, a third symbol of the masked values of the parsed word by incrementing a third symbol of the parsed word by two; and
        generating, by the first party's computer, a fourth symbol of the masked values of the parsed word by inserting a predetermined marker symbol,
        wherein the symbols, used to represent basic sounds of a language, are contained in a set in a fixed order.

2. The method of claim 1, said method further comprising: storing, by the first party's computer, the masked values into a mask database on the first party's computer.

3. The method of claim 1, wherein said generating masked values of the vulnerable words and numbers further comprises:
    generating, by the first party's computer, a fifth symbol of the masked value of the parsed word by decrementing a fourth symbol of the parsed word by two;
    generating, by the first party's computer, a sixth symbol of the masked value of the parsed word by incrementing a fifth symbol of the parsed word by three;
    generating, by the first party's computer, a seventh symbol of the masked value of the parsed word by decrementing a sixth symbol of the parsed word by three; and
    generating, by the first party's computer, an eighth symbol of the masked values of the parsed word by inserting the predetermined marker symbol incremented by one.

4. The method of claim 1, wherein said generating masked values of the vulnerable words and numbers comprises:
    generating, by the first party's computer, a first digit of the masked values of a parsed number by incrementing a first digit of the parsed number by one;
    generating, by the first party's computer, a second digit of the masked values of the parsed number by decrementing a second digit of the parsed number by one;
    generating, by the first party's computer, a third digit of the masked values of the parsed number by incrementing a third digit of the parsed number by two;
    generating, by the first party's computer, a fourth digit of the masked values of the parsed number by decrementing a fourth digit of the parsed number by two;
    generating, by the first party's computer, a fifth digit of the masked values of the parsed number by incrementing a fifth digit of the parsed number by three; and
    generating, by the first party's computer, a sixth digit of the masked values of the parsed number by decrementing a sixth digit of the parsed number by three.

5. The method of claim 1, wherein the second party is a company, the first party is a customer of the company, and the data set is a feedback data set providing feedback for the company from the customer.

6. The method of claim 5, further comprising categorizing and storing, by the customer's computer, the words and numbers of the feedback data set into the mask database on the customer's computer, wherein the mask database includes: a Location Database relating the words and numbers of the feedback data to customer locations; a Product Database relating the words and numbers of the feedback data to company products; a Feature Database relating the words and numbers of the feedback data to features of the company products; a Sentiment Database relating the words and numbers of the feedback data to sentiments of the customers to the company products; and a Plan Database relating the words and numbers of the feedback data to company plans and services.

7. The method of claim 1, further comprising the second party decoding the masked values upon receiving the updated data set after analysis by the third party.

8. A computer program product, comprising one or more computer readable hardware storage devices having computer readable program code stored therein, said program code containing instructions executable by a computing device to implement a method of securely transferring data over a computer network, said method comprising:
    receiving, at a first party's computer over the computer network, a data set providing information for a second party, the data set including words and numbers;
    identifying, by the first party's computer, vulnerable words and numbers of the data set;
    parsing, by the first party's computer, the identified vulnerable words and numbers of the data set;

generating, by the first party's computer, masked values of the parsed vulnerable words and numbers;

updating, by the first party's computer, the data set by replacing the vulnerable words and numbers with the masked values; and sending, by the first party's computer over the computer network, the updated data set to a third party for analysis, and for subsequent decoding, by the second party, of the masked values of the parsed vulnerable words and numbers, wherein said generating masked values of the vulnerable words and numbers comprises:

generating, by the first party's computer, a first symbol of the masked values of a parsed word by incrementing a first symbol of the parsed word by one;

generating, by the first party's computer, a second symbol of the masked values of the parsed word by decrementing a second symbol of the parsed word by one;

generating, by the first party's computer, a third symbol of the masked values of the parsed word by incrementing a third symbol of the parsed word by two; and generating, by the first party's computer, a fourth symbol of the masked values of the parsed word by inserting a predetermined marker symbol, wherein the symbols, used to represent basic sounds of a language, are contained in a set in a fixed order.

9. The computer program product of claim 8, said method further comprising:

storing, by the first party's computer, the masked values into a mask database on the first party's computer.

10. The computer program product of claim 8, wherein said generating masked values of the vulnerable words and numbers further comprises:

generating, by the first party's computer, a fifth symbol of the masked value of the parsed word by decrementing a fourth symbol of the parsed word by two;

generating, by the first party's computer, a sixth symbol of the masked value of the parsed word by incrementing a fifth symbol of the parsed word by three;

generating, by the first party's computer, a seventh symbol of the masked value of the parsed word by decrementing a sixth symbol of the parsed word by three; and generating, by the first party's computer, an eighth symbol of the masked values of the parsed word by inserting the predetermined marker symbol incremented by one.

11. The computer program product of claim 8, wherein said generating masked values of the vulnerable words and numbers comprises:

generating, by the first party's computer, a first digit of the masked values of a parsed number by incrementing a first digit of the parsed number by one;

generating, by the first party's computer, a second digit of the masked values of the parsed number by decrementing a second digit of the parsed number by one;

generating, by the first party's computer, a third digit of the masked values of the parsed number by incrementing a third digit of the parsed number by two;

generating, by the first party's computer, a fourth digit of the masked values of the parsed number by decrementing a fourth digit of the parsed number by two;

generating, by the first party's computer, a fifth digit of the masked values of the parsed number by incrementing a fifth digit of the parsed number by three; and generating, by the first party's computer, a sixth digit of the masked values of the parsed number by decrementing a sixth digit of the parsed number by three.

12. The computer program product of claim 8, wherein the second party is a company, the first party is a customer of the company, and the data set is a feedback data set providing feedback for the company from the customer.

13. The computer program product of claim 12, wherein the method further comprises:

categorizing and storing, by the customer's computer, the words and numbers of the feedback data set into the mask database on the customer's computer, wherein the mask database includes: a Location Database relating the words and numbers of the feedback data to customer locations; a Product Database relating the words and numbers of the feedback data to company products; a Feature Database relating the words and numbers of the feedback data to features of the company products; a Sentiment Database relating the words and numbers of the feedback data to sentiments of the customers to the company products; and a Plan Database relating the words and numbers of the feedback data to company plans and services.

14. The computer program product of claim 8, wherein the method further comprises the second party decoding the masked values upon receiving the updated data set after analysis by the third party.

15. A system, comprising a computing device, said computing device comprising one or more processors, one or more memories, and one or more computer readable hardware storage devices, said one or more hardware storage devices containing program code executable by the one or more processors via the one or more memories to implement a method for securely transferring data over a computer network, said method comprising:

receiving, at a first party's computer over the computer network, a data set providing information for a second party, the data set including words and numbers;

identifying, by the first party's computer, vulnerable words and numbers of the data set;

parsing, by the first party's computer, the identified vulnerable words and numbers of the data set;

generating, by the first party's computer, masked values of the parsed vulnerable words and numbers;

updating, by the first party's computer, the data set by replacing the vulnerable words and numbers with the masked values; and sending, by the first party's computer over the computer network, the updated data set to a third party for analysis, and for subsequent decoding, by the second party, of the masked values of the parsed vulnerable words and numbers, wherein said generating masked values of the vulnerable words and numbers comprises:

generating, by the first party's computer, a first symbol of the masked values of a parsed word by incrementing a first symbol of the parsed word by one;

generating, by the first party's computer, a second symbol of the masked values of the parsed word by decrementing a second symbol of the parsed word by one;

generating, by the first party's computer, a third symbol of the masked values of the parsed word by incrementing a third symbol of the parsed word by two; and generating, by the first party's computer, a fourth symbol of the masked values of the parsed word by inserting a predetermined marker symbol, wherein the symbols, used to represent basic sounds of a language, are contained in a set in a fixed order.

16. The system of claim 15, said method further comprising:

storing, by the first party's computer, the masked values into a mask database on the first party's computer.

17. The system of claim 15, wherein said generating masked values of the vulnerable words and numbers further comprises:

generating, by the first party's computer, a fifth symbol of the masked value of the parsed word by decrementing a fourth symbol of the parsed word by two;

generating, by the first party's computer, a sixth symbol of the masked value of the parsed word by incrementing a fifth symbol of the parsed word by three;

generating, by the first party's computer, a seventh symbol of the masked value of the parsed word by decrementing a sixth symbol of the parsed word by three; and generating, by the first party's computer, an eighth symbol of the masked values of the parsed word by inserting the predetermined marker symbol incremented by one.

18. The system of claim 15, wherein said generating masked values of the vulnerable words and numbers comprises:

generating, by the first party's computer, a first digit of the masked values of a parsed number by incrementing a first digit of the parsed number by one;

generating, by the first party's computer, a second digit of the masked values of the parsed number by decrementing a second digit of the parsed number by one;

generating, by the first party's computer, a third digit of the masked values of the parsed number by incrementing a third digit of the parsed number by two;

generating, by the first party's computer, a fourth digit of the masked values of the parsed number by decrementing a fourth digit of the parsed number by two;

generating, by the first party's computer, a fifth digit of the masked values of the parsed number by incrementing a fifth digit of the parsed number by three; and generating, by the first party's computer, a sixth digit of the masked values of the parsed number by decrementing a sixth digit of the parsed number by three.

19. The system of claim 15, wherein the second party is a company, the first party is a customer of the company, and the data set is a feedback data set providing feedback for the company from the customer.

20. The system of claim 19, wherein the method further comprises:

categorizing and storing, by the customer's computer, the words and numbers of the feedback data set into the mask database on the customer's computer, wherein the mask database includes: a Location Database relating the words and numbers of the feedback data to customer locations; a Product Database relating the words and numbers of the feedback data to company products; a Feature Database relating the words and numbers of the feedback data to features of the company products; a Sentiment Database relating the words and numbers of the feedback data to sentiments of the customers to the company products; and a Plan Database relating the words and numbers of the feedback data to company plans and services.

* * * * *